DATA INPUT DEVICE

Filed April 4, 1960 17 Sheets-Sheet 1

INVENTORS
KENNETH A. BELL
DONALD S. MAC LEOD
BY William N. Barret Jr.
ATTORNEY

Dec. 7, 1965 K. A. BELL ETAL 3,222,648

DATA INPUT DEVICE

Filed April 4, 1960 17 Sheets-Sheet 8

Dec. 7, 1965 K. A. BELL ETAL 3,222,648

DATA INPUT DEVICE

Filed April 4, 1960 17 Sheets-Sheet 14

United States Patent Office 3,222,648

Patented Dec. 7, 1965

3,222,648

DATA INPUT DEVICE

Kenneth A. Bell and Donald S. MacLeod, Vestal, N.Y., assignors to International Business Machines Corporation, New York, N.Y., a corporation of New York Filed Apr. 4, 1960, Ser. No. 19,758
10 Claims. (Cl. 340—172.5)

Figure 1:
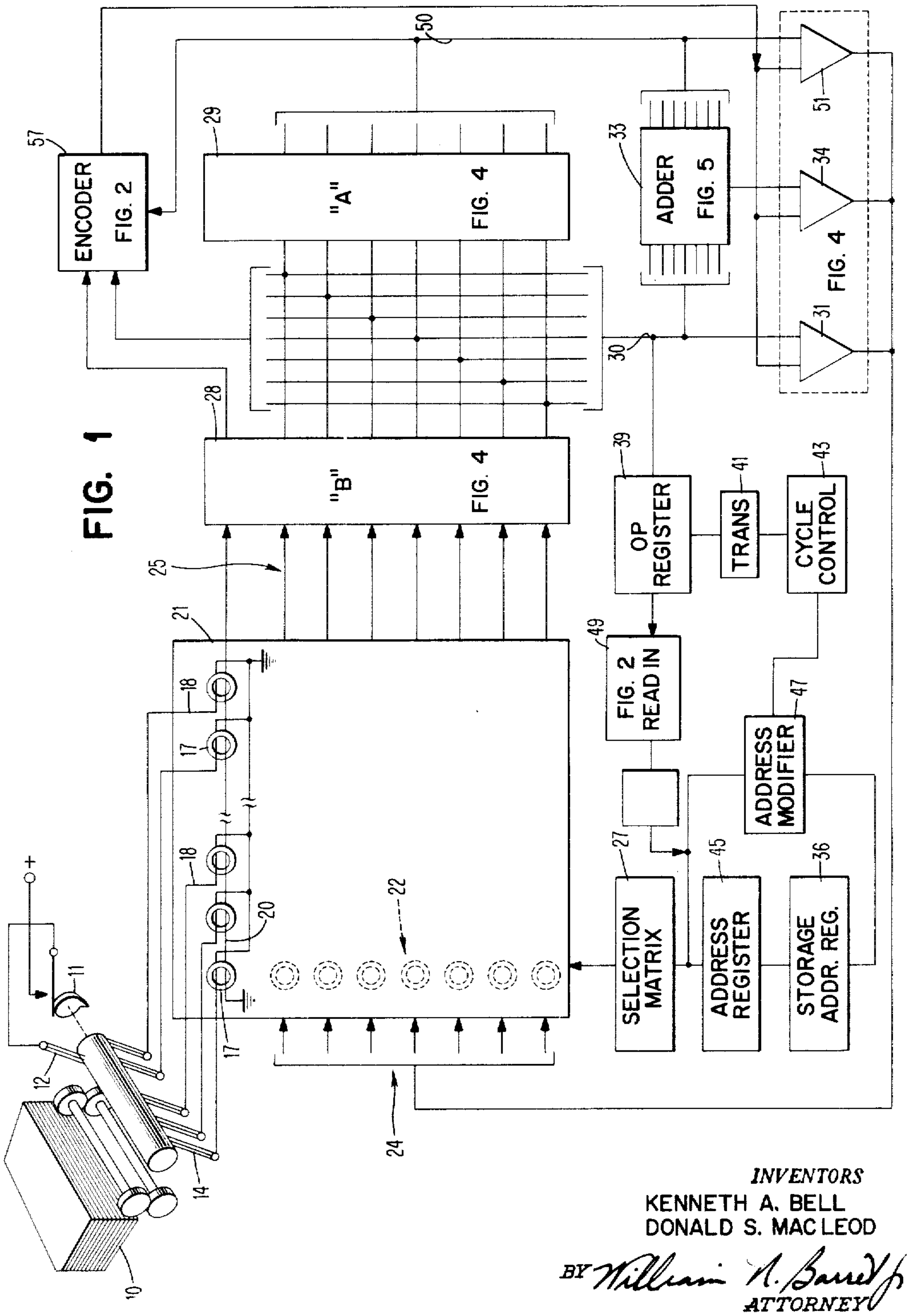

The present invention relates to a data input and in particular to an input in which data characters consisting of a number of possible bit configurations are sensed incrementally by possible bit position and transferred to a preselected storage location after each bit position as the apparent character.

In the past, a great number of inputs have been used in introducing data from a medium, such as a punched card, into a storage of a data processing machine for use therein. The problem which is presented, at least in one respect, in reading data from a punched card, arises in reading the card by row or bit position. The characters are stored as a number of punched holes in a given column so that the character is not distinguishable until after all rows of the card have been read.

One method of effecting translation from the Hollerith code into a machine code is by a continuous translating process. This type of process is one by which each bit sensed is stored in a storage as the number or zone of the row in the card in which the bit was sensed. Each further occurring bit is combined with and translated into a character designation of that bit and any previous bits stored. This results in a continuous translation process by which the character assumes different significance as added bits are sensed in successive rows.

In prior known machines of this type, the row of the card and thus the significance of the bit position then being sensed was determined through the mechanism of the record reading device. This would ordinarily take the form of some mechanical circuit closing device. With this mechanism, the significance of the row of the card being read could be translated from a pulse indicative of a hole sensed into a permutation of bits equivalent to the machine code. This coded bit would then be combined with the machine code representing previously sensed bits to indicate the character as it would appear after that particular row just sensed.

The present invention utilizes the card reader mechanism only to the extent necessary to read the successive rows of a card and utilizes the data processing machine proper to perform all necessary translation. By separating the translation function from the mechanical circuit closers of the card reader, applicants have advanced the concept of making a data processing machine independent of its input. Besides the advantage of having a data processing machine independent of the input in translating input bits to provide greater flexibility in the attachment of input or output data sources, errors which may arise from mechanical translation through contact bounce are eliminated.

While the invention is described in relation to a card input, it should be understood that any type of data medium can be used and that while this invention is described in relation to an input, it is equally applicable to an output. This will be discussed subsequently and the claims will define applicants' invention as embracing these objectives.

It is therefore an object of the present invention to provide an apparatus for translating data between a data processing machine and an external unit.

It is a further object of the present invention to provide a translating apparatus for a data processing machine and an external unit in which translation is effected solely within the processing machine.

Another object of the present invention is to provide a translating apparatus for data characters which are manifested serially by bit in which the significance of a given bit is determined by a unit operable externally of the control mechanism controlling the medium on which the characters are to be manifested.

Still another object of the present invention is to utilize the core storage of a data processing machine as a repository for control data which is periodically revised to reflect the condition of a unit external to the data processing machine.

Yet another object of the present invention is to provide an apparatus for a data processing machine by which control translation data for an external unit is revised periodically under stimulus of data flow from the external unit and the machine.

The foregoing and other objects, features and advantages of the invention will be apparent from the following more particular description of a preferred embodiment of the invention, as illustrated in the accompanying drawings.

In the drawings:

FIG. 1 is a schematic illustration of the invention.

Figure 2A:
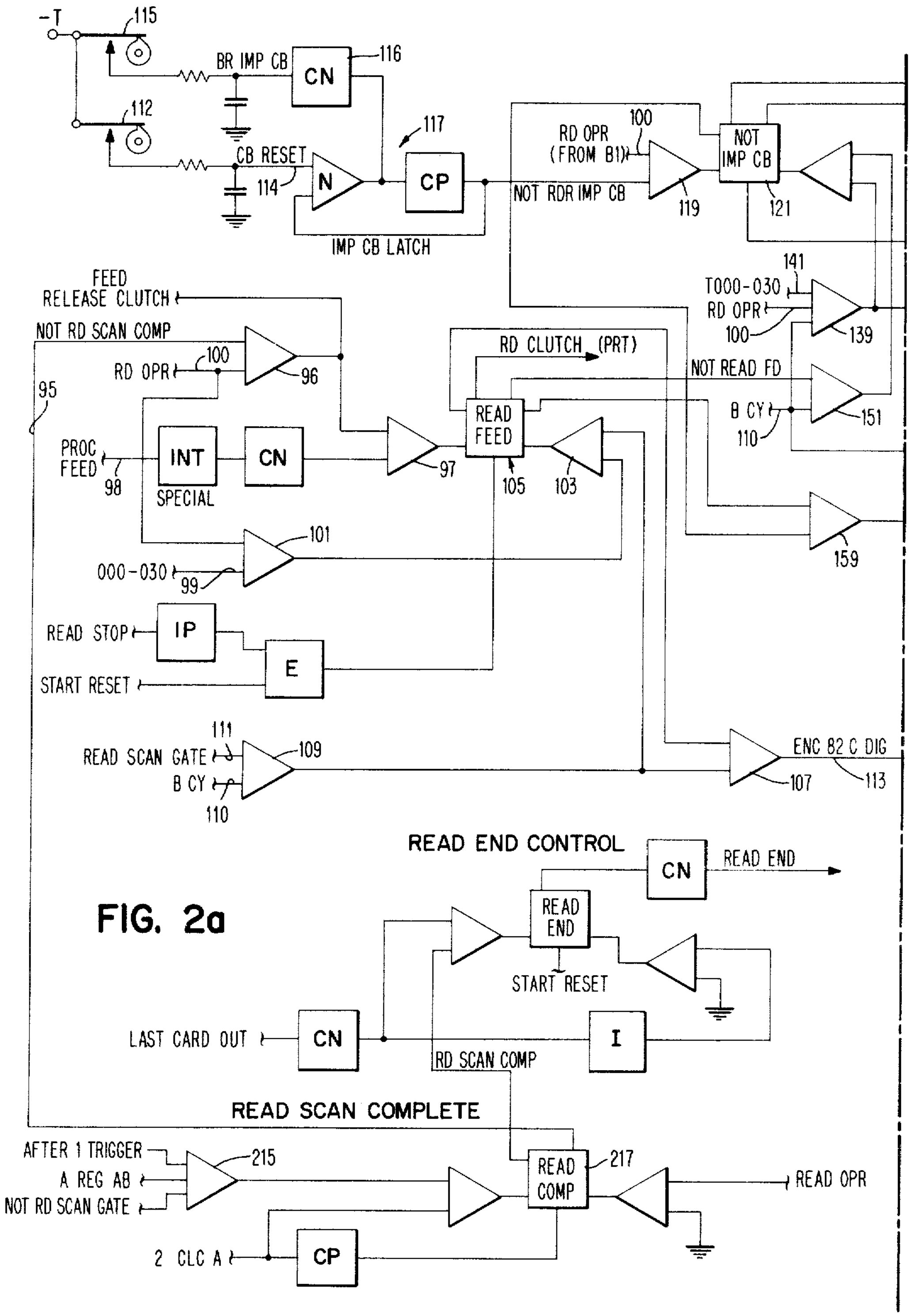
Figure 2B:
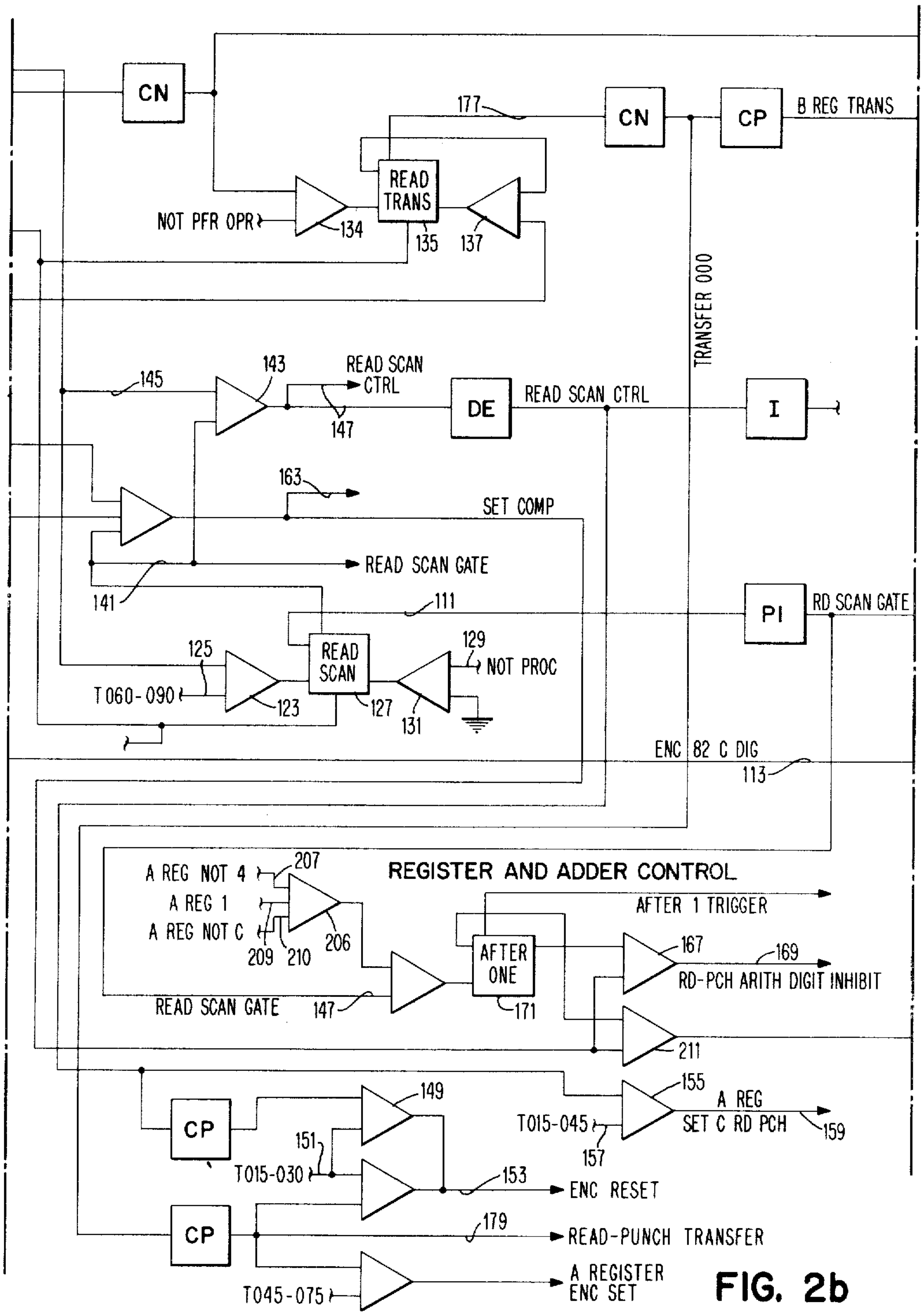
Figure 2C:
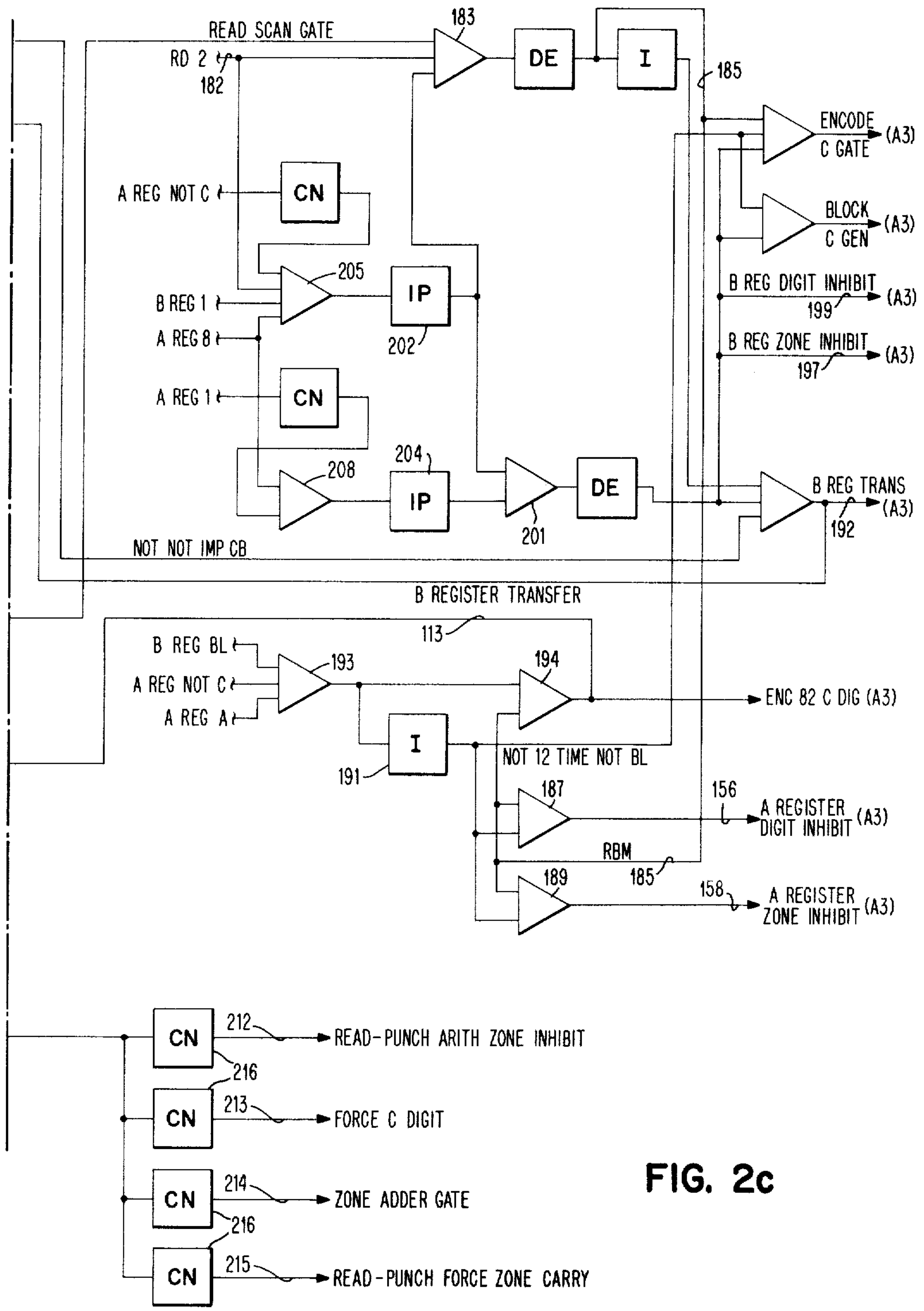

FIGS. 2*a*, 2*b*, and 2*c* is a circuit diagram for the read-in circuitry of the data processing machine shown in FIG. 1.

Figure 3:
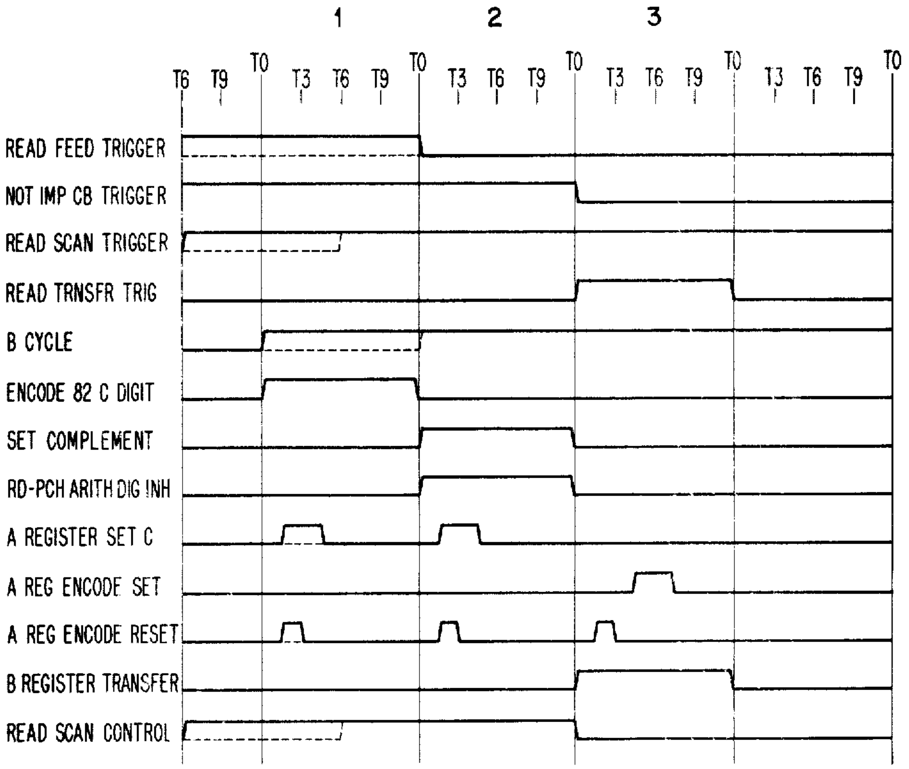

FIG. 3 is a timing chart illustrating the sequence of operations for the invention.

Figure 4A:
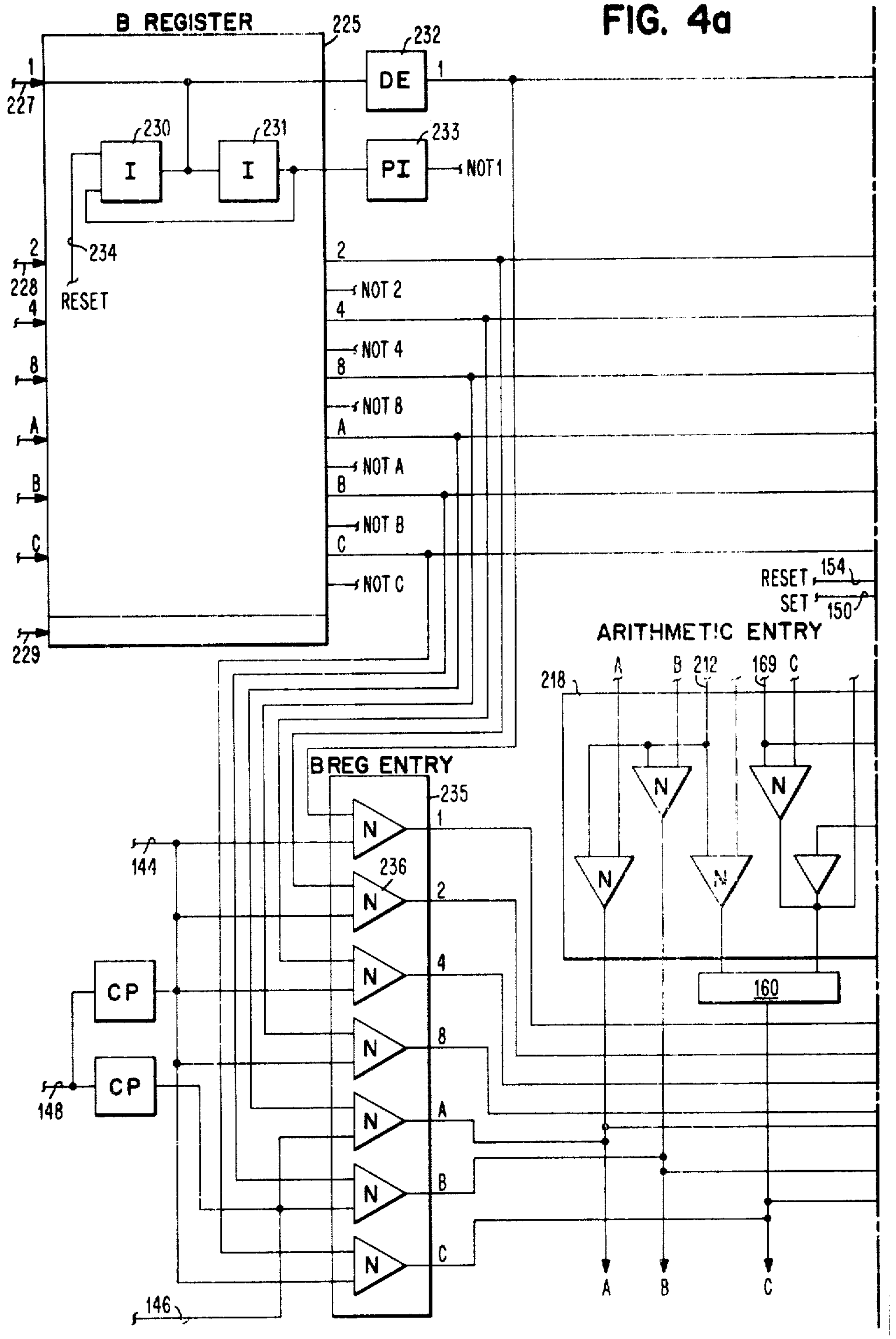
Figure 4B:
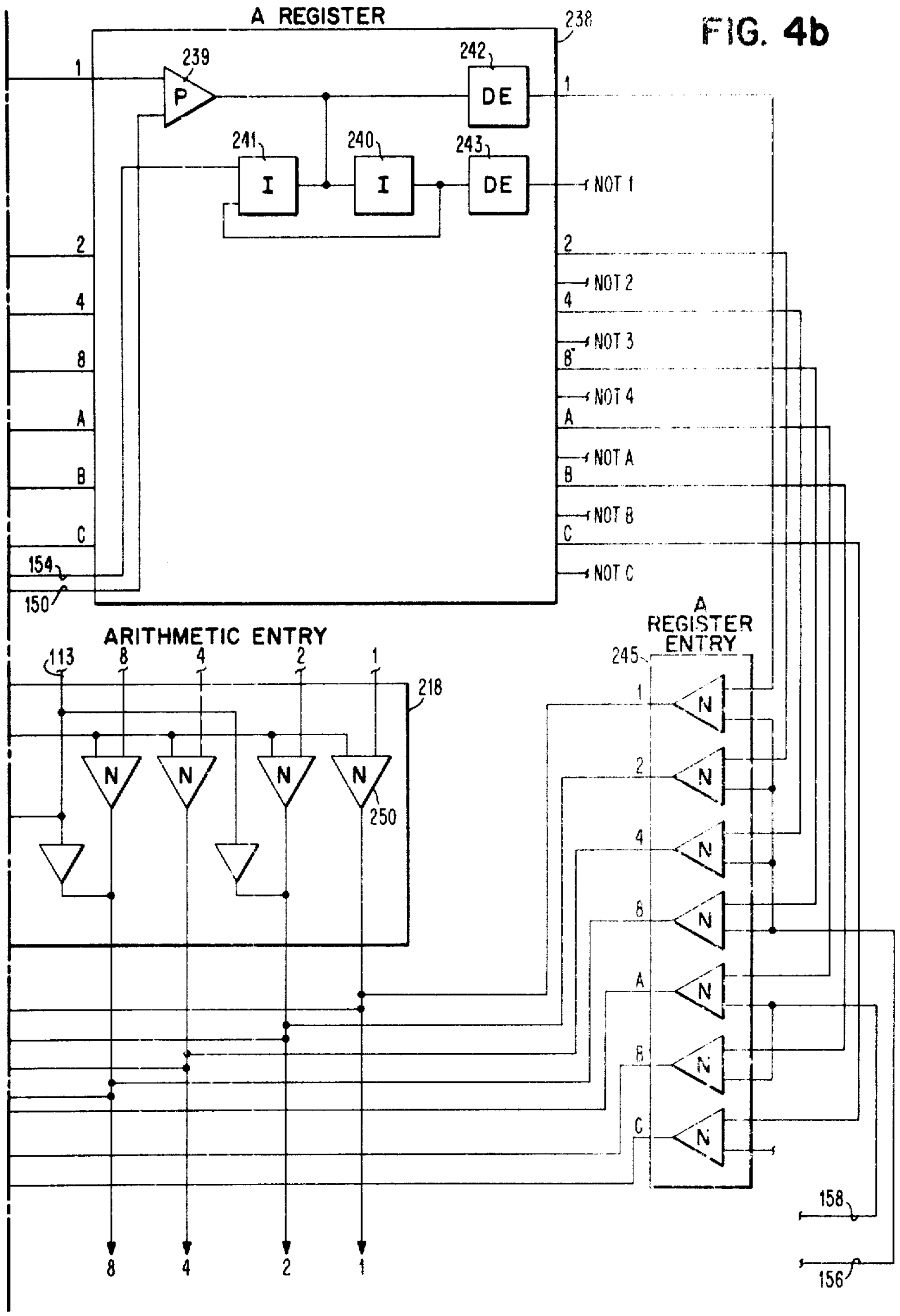

FIGS. 4*a* and 4*b* is an illustration of the control circuitry consisting of the "B" and "A" registers 28 and 29 and the inhibit gates 31, 34, and 51 of FIG. 1.

FIGS. 5*a*–5*h* is the adder 33 shown in FIG. 1.

FIGS. 6, 6*a*, 7, 7*a*, 8, 8*a*, 9, 9*a*, and 10, 10*a* are illustrations of the logic blocks and their circuitry used in the present invention.

Figure 11:
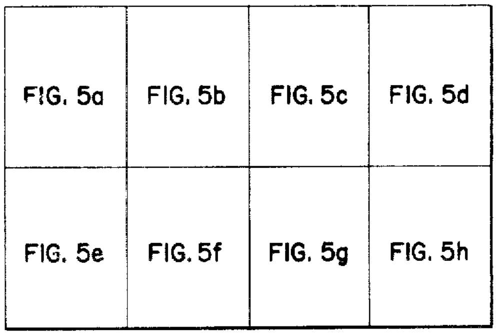

FIG. 11 is an illustration of how FIGS. 5*a*–5*h* are to be joined together.

*General description*

The present invention forms a portion of a larger data processing system. In order to describe the invention, those portions of the system which are necessary for the operation of this invention are specifically disclosed herein. For other details, reference may be made to application Serial No. 838,456, now abandoned, and continuation application 193,898, now Patent 3,185,966, in which the construction of the data processing system is set forth. In the present invention, a record card is used as the source of input information. The record card contains data as punched holes in rows and columns where each column contains a separate character or digit and the permutation of holes by row represents the coded digit. In reading a record card of this configuration, it is the general practice to read it row by row and translate any punched hole found therein into a machine code having recognizable a permutation of bits for storage. The record card has a series of rows 9 through 0, 11, and 12 on the short side and 80 columns of characters along the long side.

The coding of the card data for a selected series of characters and the machine code in which the card code is to be translated is shown below, the numbers in the card code refer to the punches present in the selected rows.

| Character | Card code | Machine code | | | | | | |
|---|---|---|---|---|---|---|---|---|
| | | C | B | A | 8 | 4 | 2 | 1 |
| Blank | | X | | | | | | |
| . | 12/3/8 | | X | X | X | | X | X |
| & | 12 | X | X | X | | | | |
| $ | 11/3/8 | X | X | | X | | X | X |
| * | 11/4/8 | | X | | X | X | | |
| - | 11 | | X | | | | | |
| , | 0/3/8 | X | | X | X | | X | X |
| A | 12/1 | | X | X | | | | X |
| B | 12/2 | | X | X | | | X | |
| C | 12/3 | X | X | X | | | X | X |
| L | 11/3 | | X | | | | X | X |
| S | 0/2 | X | | X | | | X | |
| T | 0/3 | | | X | | | X | X |
| 0 | 0 | X | | | X | | X | |
| 1 | 1 | | | | | | | X |
| 2 | 2 | | | | | | X | |
| 3 | 3 | X | | | | | X | X |
| 4 | 4 | | | | | X | | |
| 5 | 5 | X | | | | X | | X |
| 6 | 6 | X | | | | X | X | |
| 7 | 7 | | | | | X | X | X |
| 8 | 8 | | | | X | | | |
| 9 | 9 | X | | | X | | | X |

In FIG. 1, a card 10 containing 80 columns of data coded in 12 rows, is shown prior to sensing. Each of the cards pass beneath the brushes 14 of which there are 1 for each column. A circuit breaker 11 is closed for each row and furnishes a positive potential to a common brush 12 to provide a source of potential for each of the column brushes 14. The holes in a given column will be detected by the brushes 14 to provide a pulse to a particular core 17 associated with a given column of a card to set the same in a magnetizable state representing the detection of the hole in the card. These cores and the ones hereafter described are ones having a substantially rectangular hysteresis loop which are capable of being set into one or the other of two opposite stages to indicate 1 or 0. The lines for setting the cores are shown at 18.

On a readout of the information contained in each core by windings, not shown, the cores 17 are reset to a 0 state if the core has been set to a 1. If the core is already in a nonindicating state, then there will be no readout from this core. The change in current through the core to effect a readout will cause a flux change around the output winding 20 to provide a pulse out. In the core array 21, there have been no means shown for selection of a particular column such as 22, since this is conventional method of selecting the digits of a storage array.

The core array 21 is shown in one plane only, since this is the primary concern of the present invention. It should be understood however, that this core plane is actually a portion of a three-dimensional array in which any coordinate may be selected by the proper energization of readout lines. The core row buffer consisting of core 17 as shown is set solely by the output from the card reading brushes 14. Further, in order to simplify the drawing, only one full character position 22 has been shown. There would be 80 character positions used for the storage of the input data with one for storing the translation control character. The inputs from the data processing machine are shown at 24 and represent the seven bits which are used in the processing of information. It will be noted that the input from the data processing machine does not include the core storage for the row bits. The output 25, however, does include both the seven bits used in the machine and the single bit from the card row buffer.

The selection matrix 27 is utilized to effect the readout of a particular column 22 of the storage array 21 upon demand. No details of this selection matrix have been shown since this is known in the art.

Before proceeding with a description of the card reader input in relation to the processing machine, there will be described the operation of the processing machine in general terms so that the operation of the card input can be more readily associated therewith.

The data processing machine shown in FIG. 1 utilizes a serial by digit, parallel by bit character flow. The storage 21 contains all characters which are to be utilized in the internal operation of the machine. Each character will contain a combination of seven bits plus others which are not here necessary to indicate, to signify the particular significance of the character. In the particular illustration used in FIG. 1 there would be one character contained on each vertical column of magnetic cores.

With each vertical column of cores set to indicate a particular character, the character may be read out on lines 25 by selecting a desired coordinate position. This coordinate position is selected by the selection matrix which decodes an indicated number standing in an address register 45 to obtain the contents of the desired coordinates in storage indicated by this number.

When the coordinate selection is made by the matrix, the magnetic cores containing the individual bits of a character are reset to zero. When reset to zero, any characters standing therein prior to this selection will be transferred to a buffer recirculation register 28 as a combination of bits previously contained in said column of cores.

The character then standing in the buffer recirculation register 28 may be transferred to a static recirculation register 29 and also return to the same position in storage by the lines 30 upon energization of a gate 31. The character may also be utilized in a logic operation by means of an adder such as 33 and a result stored in the location from which the number originated, by suitable control on the gate 34.

In the operation of the processing machine, the address of the next instruction is contained in an instruction register not shown particularly but which can be considered a part of register 36. The address, which is a number, specifies the location of the first digit of an instruction word contained in storage 21, in a group of locations designated generally as instruction word locations. Without particularly reciting the particular details of the instruction word, it is important to note that the first position of the instruction word is the operation code while the remaining portion of the instruction word is the address of the particular operand that we will be using in the operation designated by the word. Details of this particular feature are given in the above-mentioned application.

The operation code which determines the operation of the machine is a one character designation such as "1" in this particular case. In operation, the instruction word is read from storage 21 under control of an instruction address register character by character to the recirculation register 28. The first character, which is recognized as the operation code is stored in the operation register 39. The succeeding characters of the instruction word determine the addresses of the first character in the operands to be used in the operation.

After the complete address has been read into the address register 36, the operation will proceed in accordance with the operation character stored in operation register 39. The operation register 39 is connected to a translator 41 which translates a particular operation character to a form recognized by a cycle control 43 which controls the sequence of events and transmits all necessary signals to all parts of the processing machine to provide appropriate operations.

The address register 45 is the storage device for the address which is received from the storage address register 36. This address register 45 provides a number to the selection matrix to select the character position desired for that operation. In the normal sequence of events, the output of the address register is also fed to the address modifier 47 which adds one to the number in the address register and restores the same in the storage address register 36 to provide the next sequential character location address.

In this case a further control is shown at 49 to provide the control for reading in information into the data processing machine. This read-in is also operable to provide a particular address to the selection matrix which in the particular case would be 000. This read-in control number to the matrix 27 is modified by the modifier 47 by one for each cycle but so long as the read-in control reenters 000 on each cycle, the register 36 will always indicate 001. In the general operation of the machine, therefore, characters will be selected out of the storage array 21 and transferred to a "B" register 28 where they may be transferred on the write portion of the storage cycle to the "A" register 29 and/or transferred back through line 30 and through the gates 31 back into the storage 21 to the input 24 into the same digit location as determined selection matrix 27. Further, the "A" register may be read out by the output 49 selected by the AND gate 51 so that on a readout from storage we may transmit back to the memory from the "B" register or from the "A" register or from the adder 33 to effect a new digit or combine the old digit which was previously stored in the storage array 21 in that character position.

*General description of data input*

As a card 10 advances between a contact roll 13 and the brushes 14, the circuit breaker 11 will close during each row time and apply potential to roll 13. All those columns of the card having holes punched in that row will allow the brush associated with that column to complete a circuit to contact roll 13 and through the individual core 17 associated with that particular column to set the same.

Subsequent to the opening of the circuit breaker 11 for the first row of the card 10, a storage location 000 in the storage array 21 will be used to store a number indicative of the number of the row of the card sensed, in this case, 9. This is done by setting the "A" register 29 with a zero and compliment adding the same to the number stored in "B" register 28, which would be zero. The 9's complement of 0 is 9 so that 9 will be entered back into storage location 000. This is subsequently read out and stored in "A" register 29.

The character positions 1–80 will then be read out to the "B" register. Here the presence of a bit from a given character position will be sensed by encoder 57. If a bit is present, the encoder will furnish a signal to the AND circuit 51 and read back into storage 21, a 9 which is the number set in register 29.

After the next row of the card is read, the "A" register 29 is reset to 0 and the 9 from storage location 000 transferred to the "B" register 28. The 9 and 0 are complement added. The 0 here would provide a complement of 9 and the output of adder 33 will be 8 with a 1 to carry. In a read-in operation, this 1 will be suppressed. The 8 entered into storage location 000 is treated in the same manner as the 9 previously discussed.

After one hole in a particular column has been detected and coded into its particular storage location, a second hole in the same column will modify the character stored in the particular storage location to indicate the combination of the two. This is accomplished by merging the characters stored in the registers 28 and 29 by means of AND circuits 31 and 51.

Before proceeding with a detailed description of the invention, reference will be made to FIGS. 6–10 and FIGS. 6*a*–10*a* for an explanation of the logic blocks and their particular structure.

Figure 6:
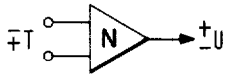
Figure 6A:
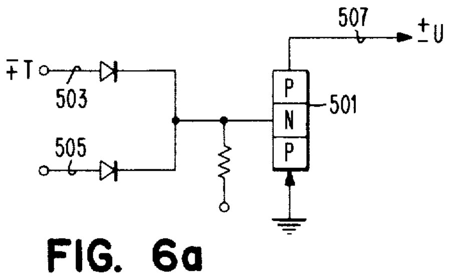

FIG. 6 shows an N type AND circuit using a PNP transistor 501, FIG. 6*a*. When both inputs 503 and 505 are biased with a —T input, the output 507 will rise to +U. If either input 503, 505 is at a +T level, the output will drop to a —U voltage.

Figure 7:
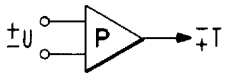
Figure 7A:
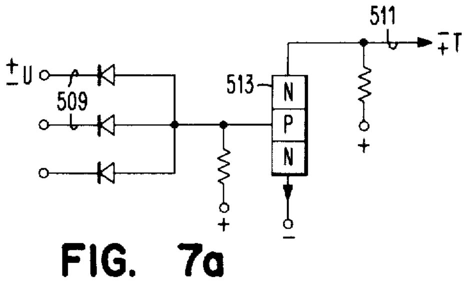

FIG. 7 shows a P type AND circuit. All inputs 509 must be at +U before the voltage at the output 511 of transistor 511 will drop to a —T voltage. Any —U input will fix the output 511 at a +T output.

Figure 8:
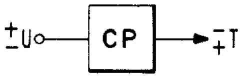
Figure 8A:
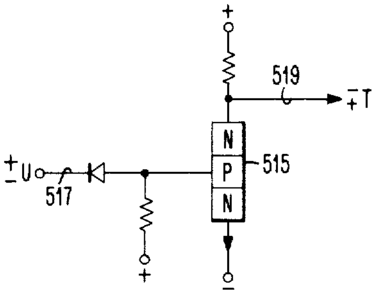

FIG. 8 illustrates a P type voltage level changer by which a +U input produces a —T output and a —U input produces a +T output. FIG. 8*a* shows the transistor 515 biased to conduction by a +U input 517 and cut off by a —U input 517 to produce a — and +T output 519.

Figure 9:
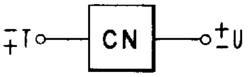
Figure 9A:
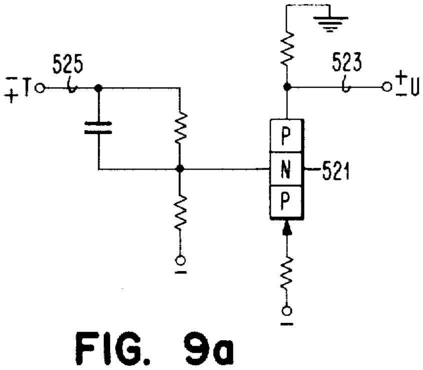

FIG. 9 illustrates a N type voltage level changer by which a —T input produces a +U output and vice versa. The circuit 9*a* utilizes a PNP transistor to produce the voltage variations at output 523 in response to the variations at input 525.

Figure 10:
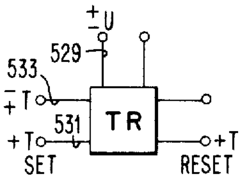

FIG. 10 illustrates a trigger circuit which utilizes four outputs of which two have been numbered 529 and 533. These outputs produce voltage levels which are of opposite sign and level.

This provides either a —T or +U output for a given side of the trigger in an ON condition.

Figure 10A:
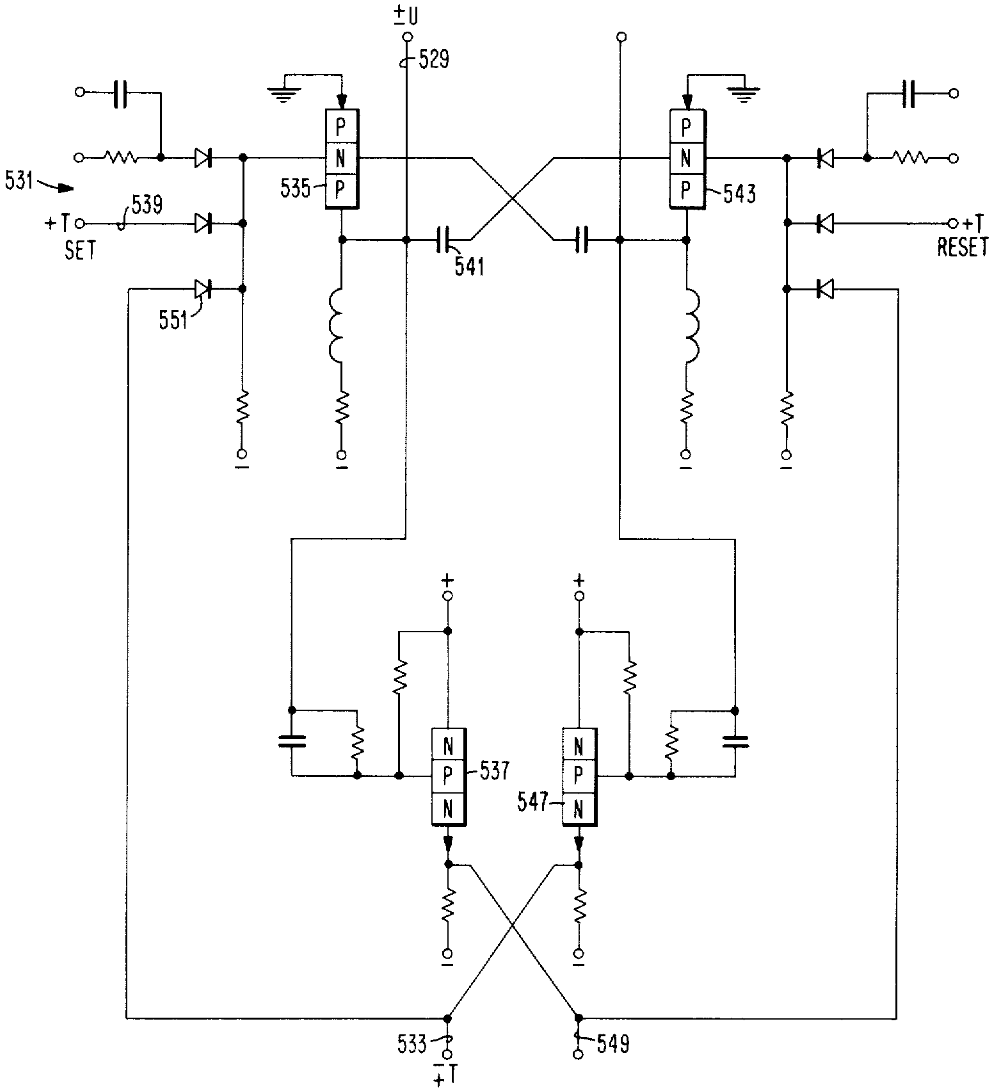

As shown in FIG. 10*a*, if transistors 535 and 537 are conducting, a +T input applied to set terminal 539 will bias the transistor 535 OFF and provide a negative pulse through condenser 541 to bias transistor 543 ON. When the collector of transistor 535 goes negative, the transistor 537 will be biased OFF. Conduction through transistor 543 causes the collector to rise to ON to keep transistor 535 OFF and turn transistor 547 ON. The rise in voltage 549 is coupled back through 551 to keep transistor 535 cut off.

*Storage entry controls (FIGS. 4a and 4b)*

In FIG. 4*a* is shown the "B" register 225 to which the characters from storage are transferred. The character bits appear on lines 227, 228 etc., and when received, set a latch consisting of two inverter AND circuits 230, 231, of which only one has been shown. These latches are reset by input 234 each time the storage is activated. The output from each latch is taken through two power amplifiers 232 and 233 to indicate that a bit was received 232 or no bit was received 233.

The output of the "B" register 225 is provided to the "B" register entry 235 which consists of a series of AND circuits 236 which are conditioned by the output of the "B" register 225 and the "B" register digit inhibit line 144 or the "B" register zone inhibit line 146 or a combination of all inhibit lines 148. These inhibit lines come from the control which will be discussed subsequently which allows different portions of the number stored in the "B" register to be gated back to memory. It should also be noted that the word "inhibit" refers specifically to storage devices and in the context as here used means "enable."

The output of the "B" register is further coupled to the "A" register 238, FIG. 4*b*. By means of a set line 150 connected to a series of AND circuits 239 of which only one is shown, the "A" register latches 240, 241 are set if a bit is stored in the corresponding latches in the "B" register. The "A" register is reset by dropping the voltage on the reset line 154. The outputs from the latch are provided at 242 and 243 and are of the same nature as that shown for "B" register. In other words, we can provide a 1 or a not 1 signal output.

The output of the "A" register 238 is coupled to the "A" register entry 245 which is similar to the "B" register entry 235 and provides a means for selectively gating the data contained in the "A" register back into storage. This is accomplished by bringing the digit inhibit line 156 to the proper level and/or the zone inhibit line 158.

Further connected in parallel as shown to the output of the "A" register and "B" register entry is the arithmetic entry 218 which is coupled from the adder 33. The arithmetic entry as shown at 218 includes a series of AND circuits 250 which are selectively energized by lines 1, 2, 4, 8, C, A, and B from the arithmetic unit. The arithmetic entry contains the same sort of AND circuit logic as that for the "A" and "B" register entry wherein the zone or the digit portion of the character from the arithmetic unit may be gated to the storage by inputs 212 and/or 169 or may force a particular type of digit on to the storage line such as 8, 2, C as shown by the input 158.

A C bit generator 160 is shown at 160 to provide the C bit or not in accordance with the number of bits contained in the character. The C bit which is used as a parity checking bit is shown used and with various associated circuits. Since the parity check does not form a necessary part of the present invention, this has not and will not be discussed in detail.

*Adder (FIGS. 5a–5h)*

Figure 5A:
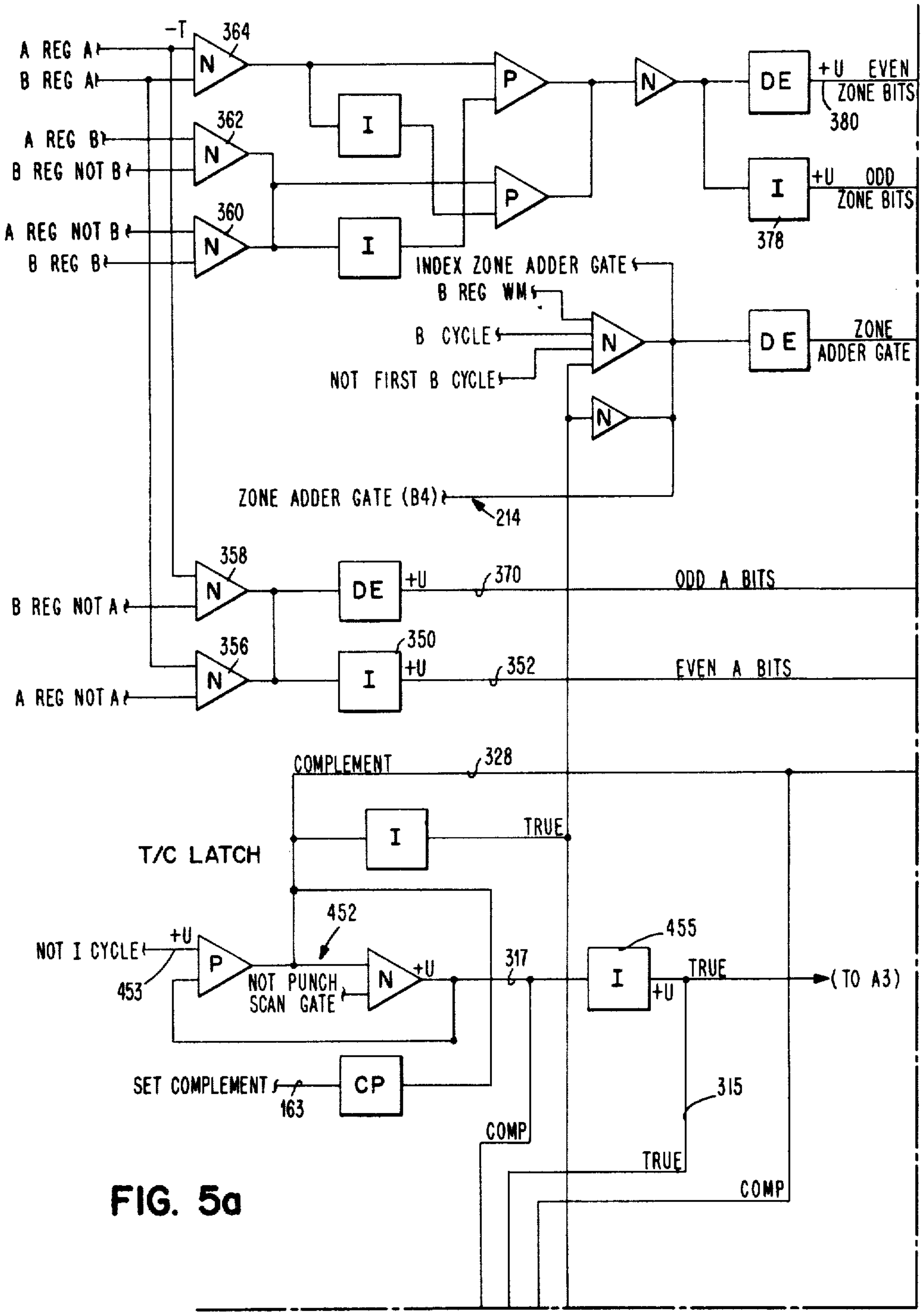
Figure 5B:
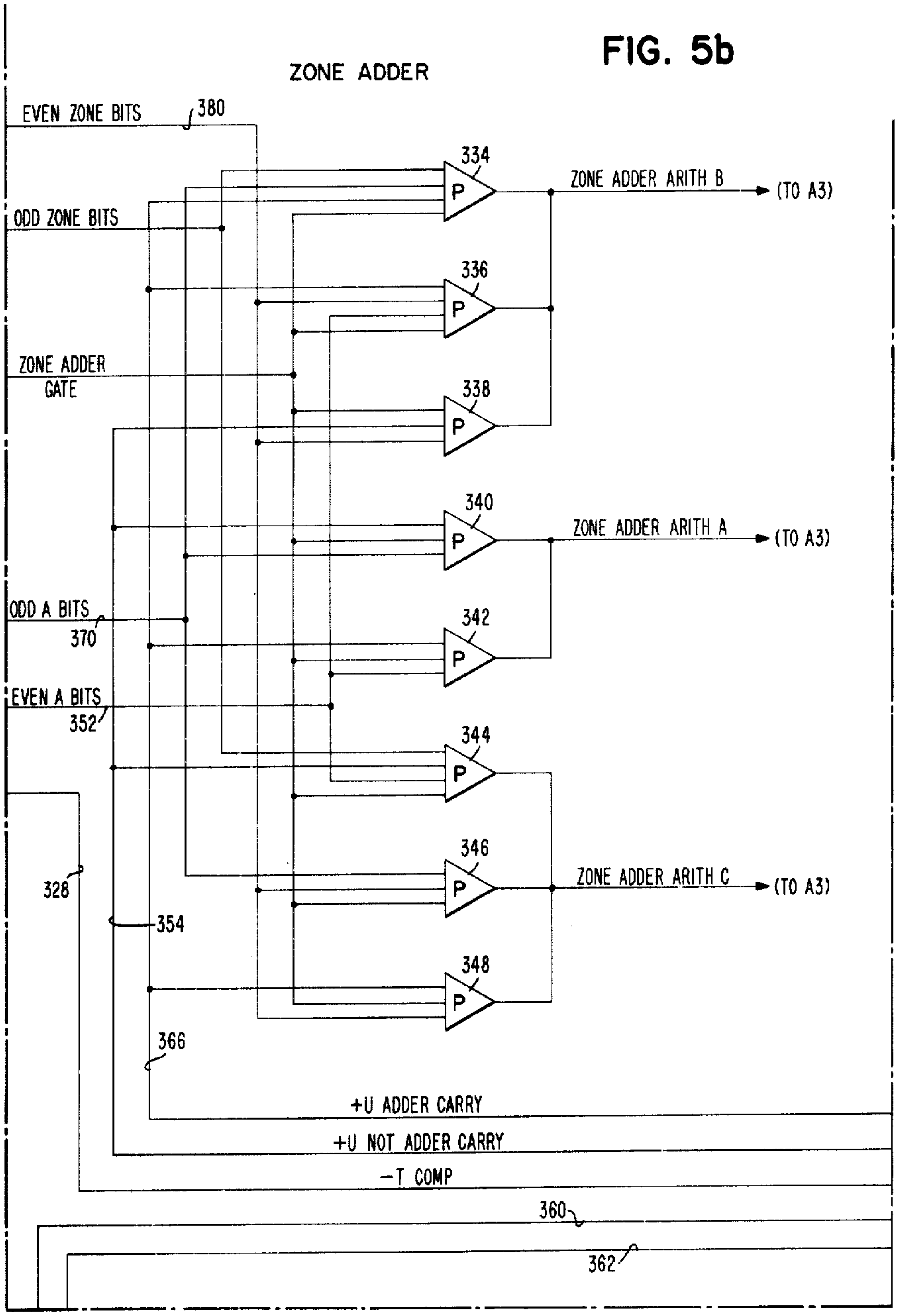
Figure 5C:
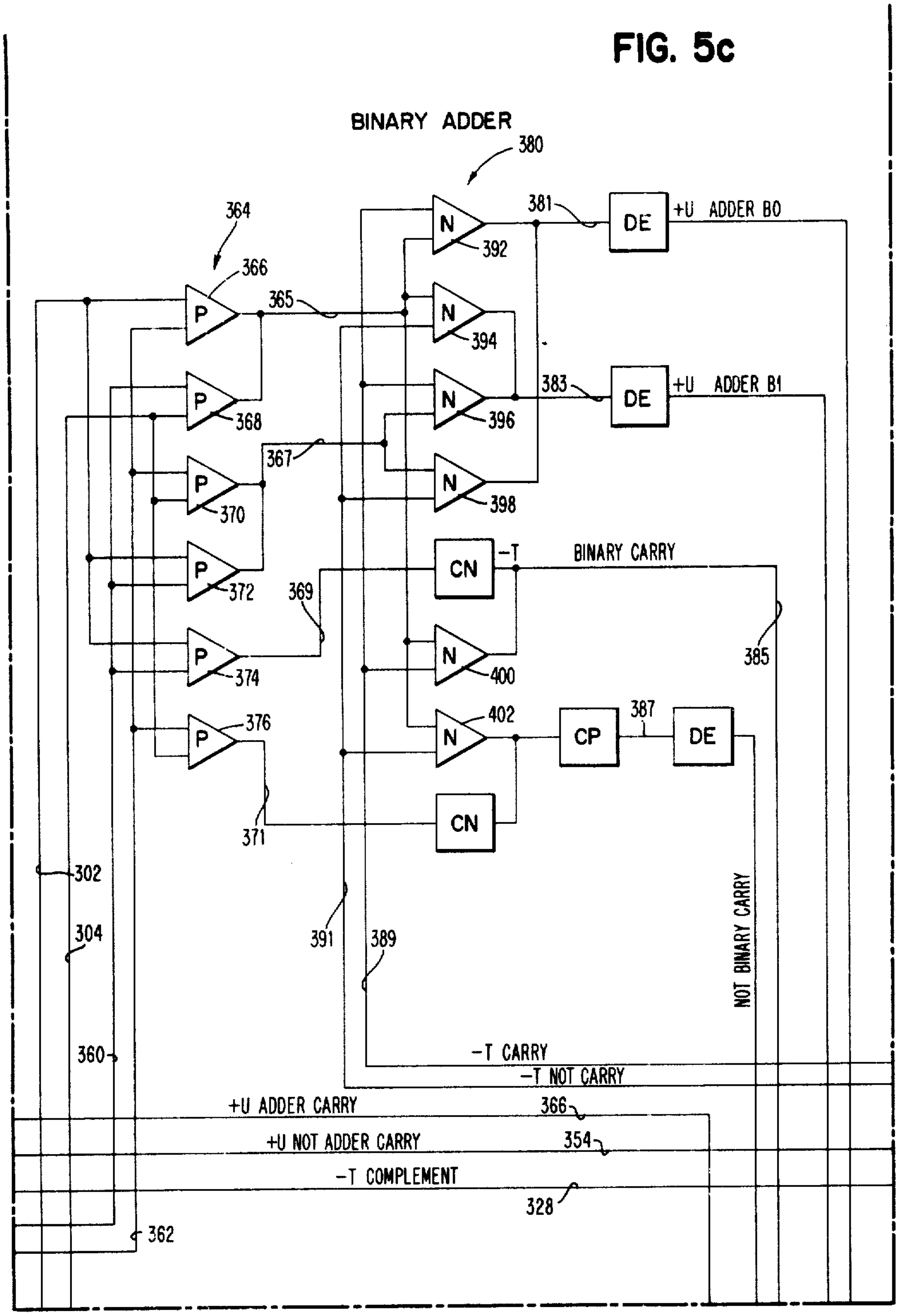
Figure 5D:
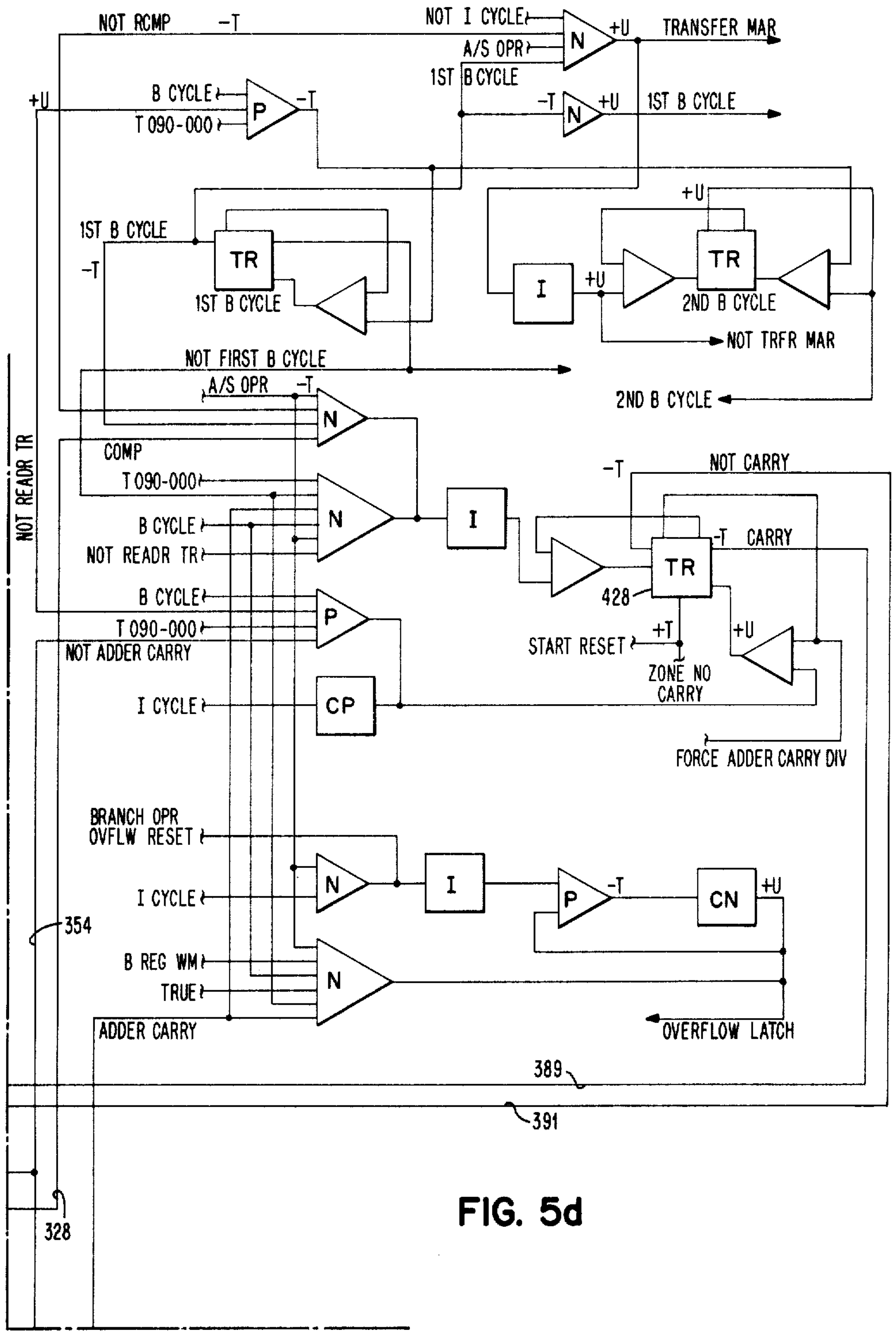
Figure 5E:
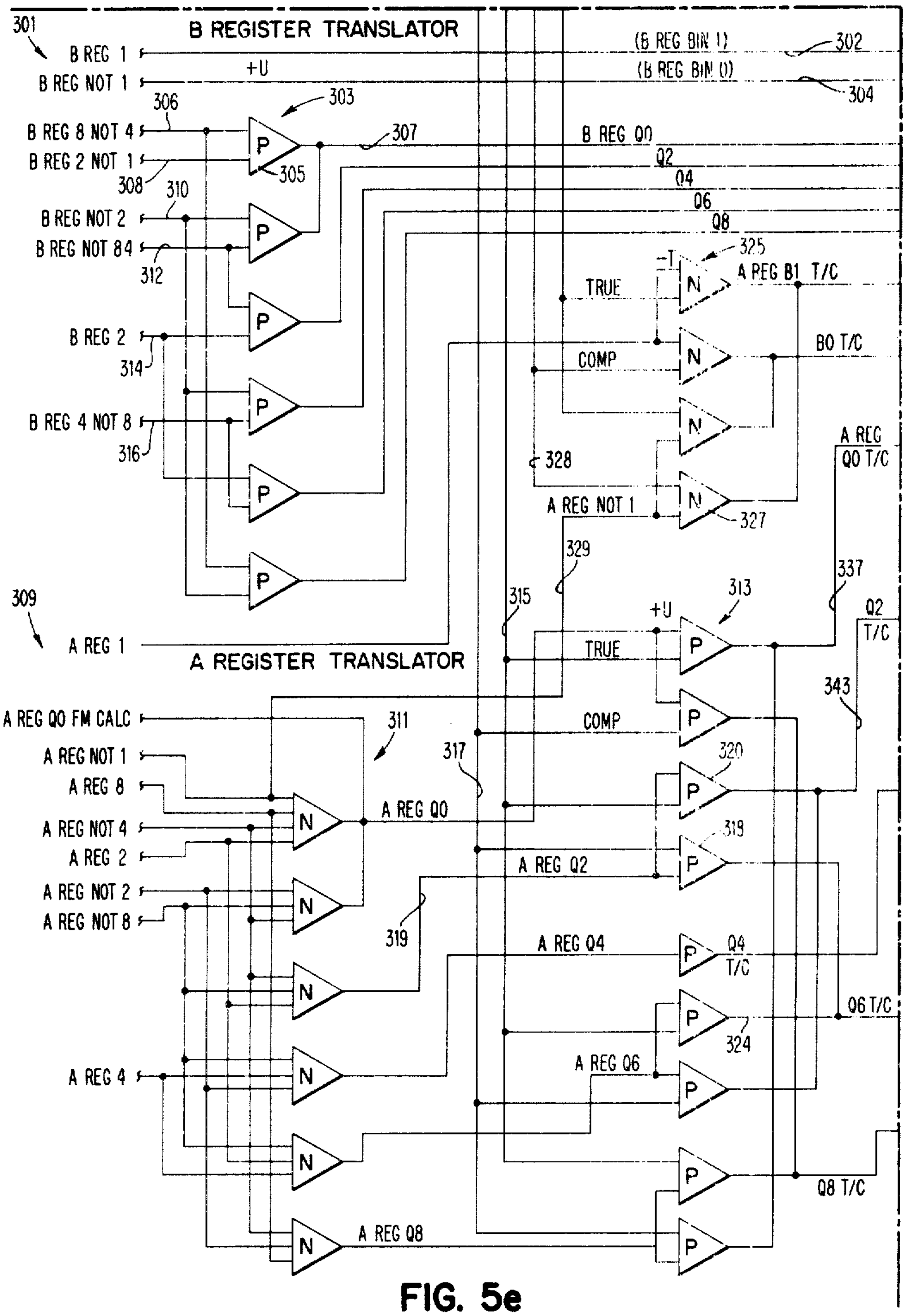

The output from the "B" register to the adder is shown at 301, FIG. 5*e*. Two inputs 302 and 304 are the 1 and not 1 inputs while the remaining inputs 306, 308, 310, 312, 314, and 316 are combinations of the various digits which appear in the "B" register. These digits are combined in the AND circuits 303 to form the decimal number 0, 2, 4, 6, and 8. For example, AND circuit 305 which has connected the 8 not 4, and the 2 not 1 will energize the line 307 for a 0. This is the 8 and 2 digit which indicates 0.

Outputs from the "A" register 309 are also coupled through the AND circuits 311 to perform the same function which is translating the binary indications from the "A" register into decimal indications of 0, 2, 4, 6, and 8.

For the outputs of the "A" register a series of AND circuits 313, in cooperation with an input 315 or an input 317 determine respectively whether the output from the AND circuits 313 will be in the true or complemented form. If the line 317 is energized, the output of AND circuits 313 will be in the 9's complement of the number introduced therein. If the line 315 is energized, the output will be the same number introduced to the input.

This can be seen quite readily by taking the input line 319 which is the 2 line above, shown as Q2, which is connected to the AND circuit 318 and 320. When the complement line 317 is energized, the Q2 line 343 will not be energized but the Q6 line 324 will be energized by the output of AND circuit 318. The other portion of the complemented number will come from the translator 325.

This is the binary or units digit translator. When the 0 bit is present as it would be for the 2 input, the output 1, line 360, will be up and AND circuit 327 in this instance would be conditioned complement line 328 the "A" register not 1 input 329.

Figure 5F:
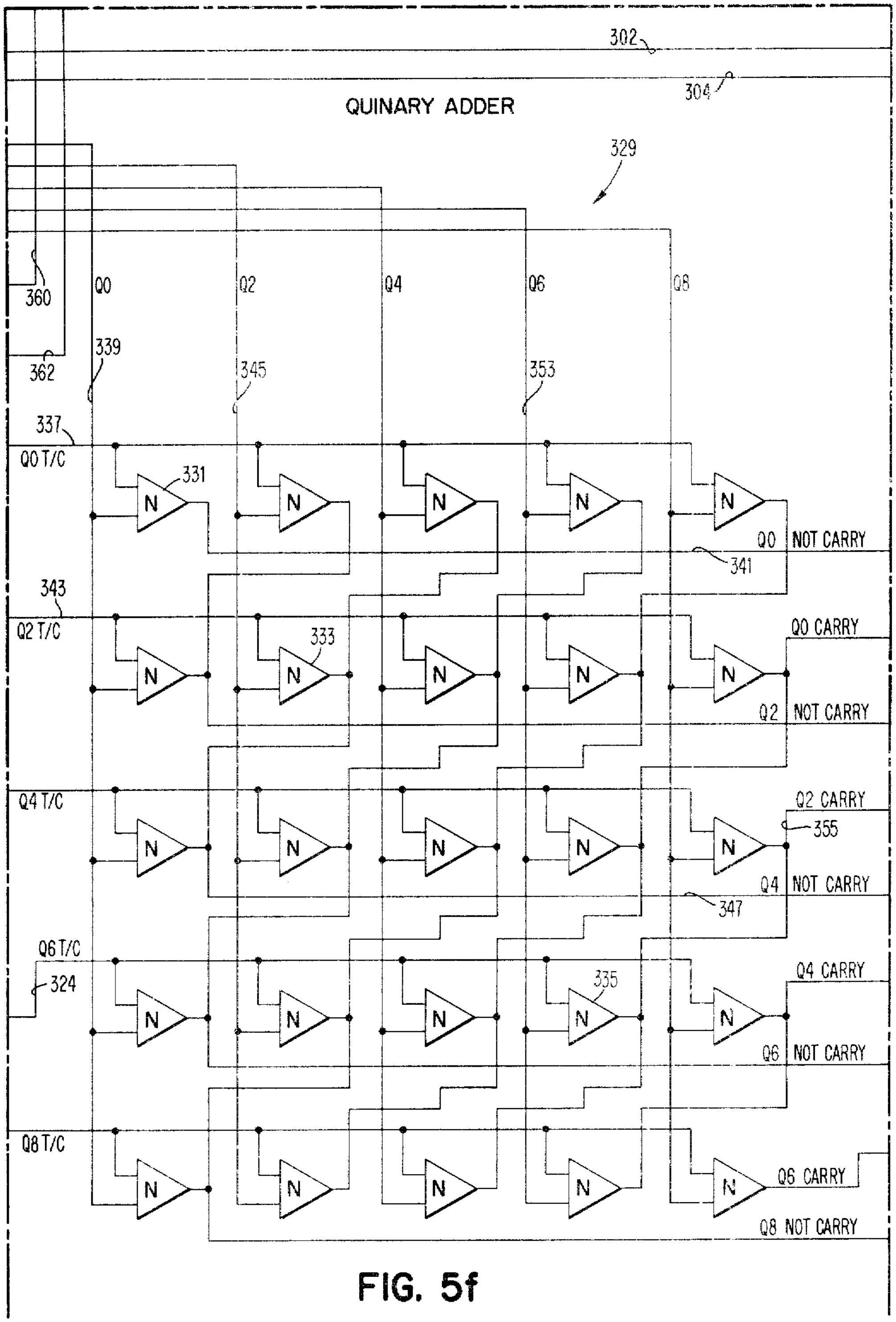

The quinary adder, FIG. 5*f*, which receives the decimal bits from the "B" register and the "A" register is a rectangular matrix of AND circuits 331, 333, 335, etc. These AND circuits are the same except for their coordinate position in the matrix. The AND circuit 331 for example has connected thereto the Q0 line from the "A" register 337 and the Q0 line from the "B" register 339 to provide an output at the output 341 which is the Q0 with no carry.

The AND circuit 333, which is connected to the decimal Q2 line 343 and the decimal 2 line from the "B" register 345, provides an output 347 when both inputs are raised which is the decimal Q4 with no carry. The AND circuit 335 which is shown connected to the Q6 line 353 from the A register and the Q6 line 324 from the "B" register energizes the Q2 carry line 355. This provides a decimal 2 output with a carry of ten which will be recognized later.

From the quinary adder, FIG. 5*f*, the outputs are divided into two groups. The not carry lines are shown connected to isolating circuits 357, FIG. 5*g*, to provide the output 0, 2, 4, 6, and 8. The carry output is connected both to the circuits 357 and a further network 359 to indicate that the number is greater than 10 and therefore provides an indication of the tens digit to the isolation circuit 361, 363.

The binary adder, FIG. 5*c*, has the inputs 302, 304, FIG. 5*e*, from the "B" register and inputs 360 and 362, FIG. 5*e*, connected thereto from the "A" register and these are combined in AND circuit network 364. The AND circuit 366 detects 1 and 0 from the registers "B" and "A" while the AND circuit 368 detects the opposite conditions from the same register. AND circuits 370 and 372 sense the 0 and 0 output or the 1 and 1 output to provide an indication of 0 on the line 367. The AND circuit 374 senses the 1 and 1 indication from each register to generate a 0 on the line 369 while the AND circuit 376 generates a 0 on its output in response to two zeroes from the corresponding registers.

A further series of AND gates 380 are used to sense the condition of the outputs 365, 367, 369, and 371 to generate a 0 or 1 on line 381 or 383 and a carry on line 385 or line 387 in dependence on whether there is a carry from a previous operation which is determined by whether the line 389 from a carry latch is up or whether the not carry line 391 is up. These lines are connected to the AND circuits 392, 394, 396, 398, 400, 402, to add together again the results of the addition then being performed and the results of any previous addition where there was a 1 to carry. In this respect it should be noted that both the AND circuits 372 and 374 provide the 0 output as a result of adding 1 and 1 but the AND circuit 374 is further connected to the output 385 to generate a binary carry to indicate that the addition of 1 and 1 gives 0 and 1 to carry.

Therefore, in considering the condition where a 1 is generated by a 1 and a 0 from both registers, the input line 365 will be up and the circuit 392 will be conditioned to furnish an output on line 381 which is a 0. The AND circuit 400 will be conditioned to provide a binary carry of 1. In the case where there is no carry, the result of a 1 input on line 365 will merely condition AND circuit 394 to provide a 1 output on line 383. The results of the remaining AND circuits can be seen by reference to the logic blocks and to the functions which they are to accomplish.

Figure 5G:
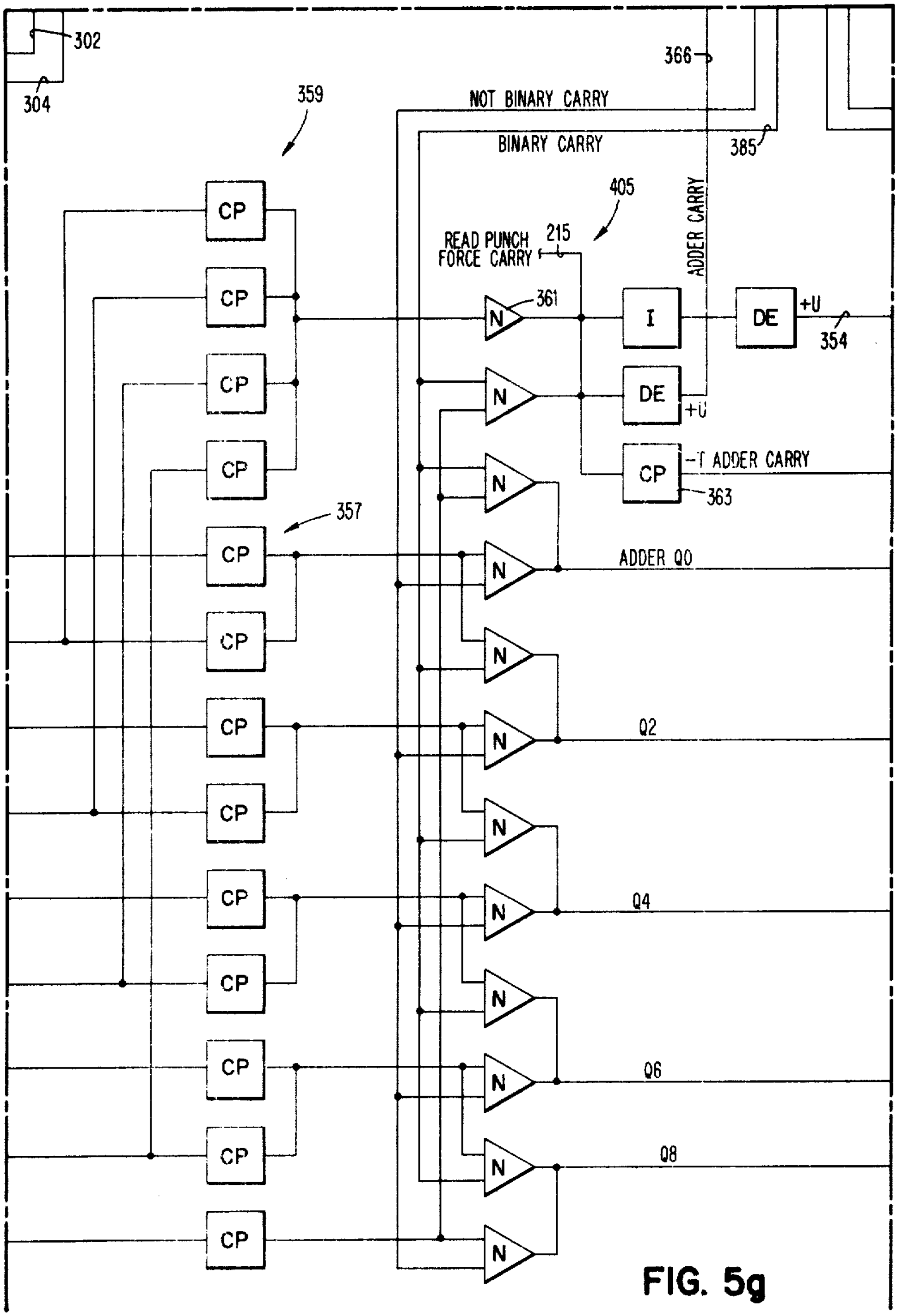

The carry line 387, which indicates that two binary digits have been combined to provide a 2, will be entered into the results of the quinary adder by means of the AND circuits 405, FIG. 5*g*. This 2 when added will modify the outputs of the AND circuits 357 by adding 2 to the output in the AND circuits 405. It is thought that this is clearly shown by the structure of the series of circuits. By the same token, the not binary carry on line 387 will enable AND circuits 405 to transfer the information from the AND circuits 357 directly as they came in. A further translation series of AND circuits, FIG. 5*h*, and isolation circuits is shown at 429 by which the presence of a binary 1 or a no binary 1 is combined with the output from AND circuit 405 to provide the proper binary coded decimal to be entered back into memory.

As has been mentioned previously, in the description of the invention, the number stored in the "A" register 29 is complement added to the number in the "B" register. This is accomplished by a set complement line 163, FIG. 5*a*, to set a complement latch 452. This latch is reset at 453 when a new instruction is taken. The output of the two AND circuits forming the latch coupled together provide a settable stable state. The output is shown at 317 and 328. The inverter 455 provides the reverse condition on output 319 in response to whether the latch 452 is set or not. When the complement line 317 is up, the results of the "A" register, FIG. 5*e*, are translated into the 9's complement and added to the contents of the "B" register by means of the quinary adder 329 and the binary adder 380 to produce a number by the translation circuit 429, FIG. 5*h*, which appears at the output thereof.

Figure 5H:
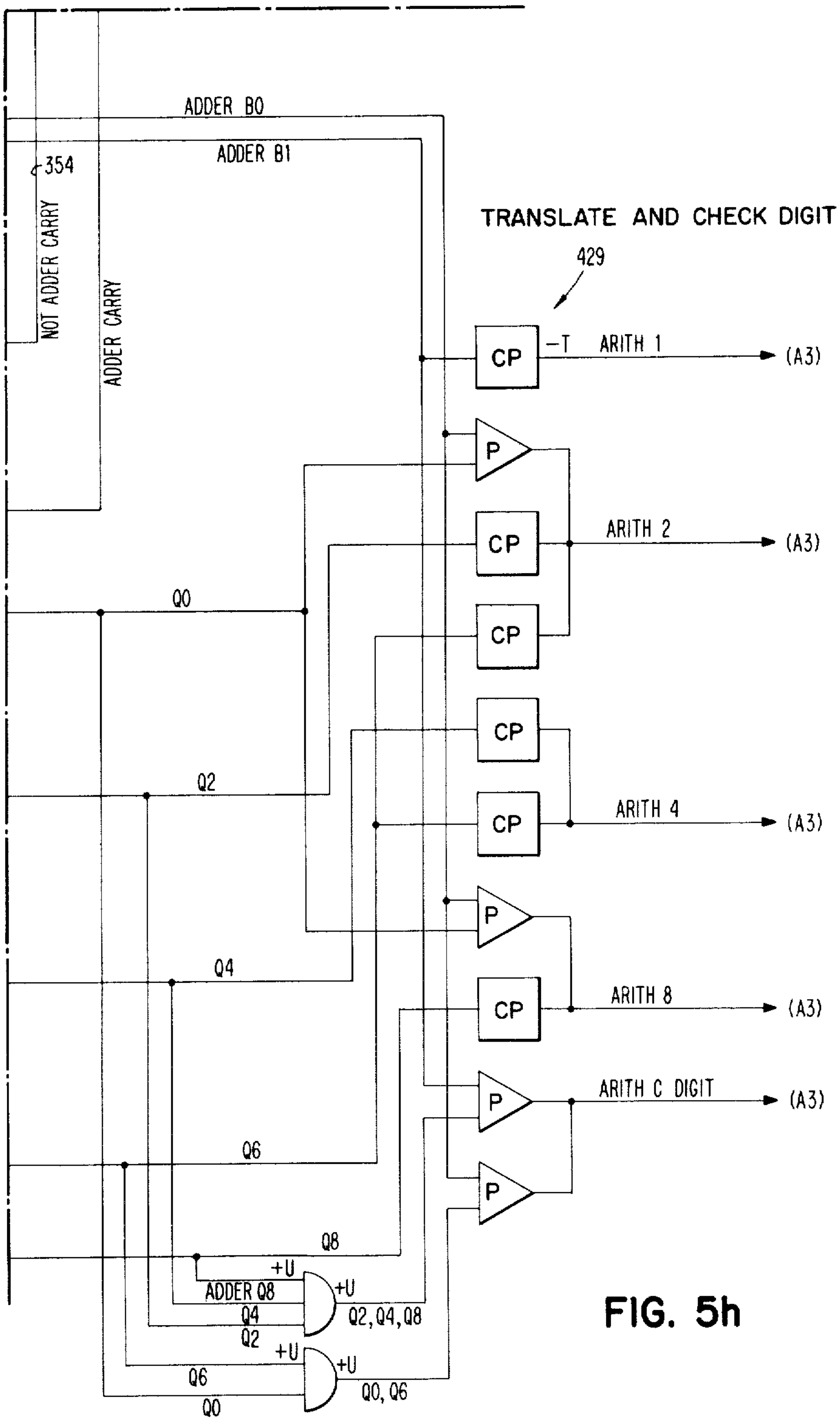

The output of the translate circuit, FIG. 5*h*, is connected to the input of the arithmetic entry 28, FIGS. 4*a* and 4*b*. The carry trigger 428, FIG. 5*d*, which would hold over a tens digit from a preceding operation is reset by the read-in operation code so that it will not be added on the next addition cycle.

When the card has progressed through the card reading station to the 0 row, the data processing machine must enter either an A with other numeric bits or a zero. To provide a zone bit in the "A" register, the zone adder, FIG. 5*b*, is utilized.

When the zone adder gate 214 is turned ON, FIG. 5*a*, this gate will condition AND circuits 334, 336, 338, etc., FIG. 5*b*. With the "A" register at zero, there will be no output from AND circuits 356, 358, etc., FIG. 5*a*, and the inverter 350 will have a raised output to indicate this fact. The output 352 will condition AND circuits 336, 342, and 344. At this time, a force carry input, FIG. 5*g*, has a signal thereon and the adder carry line 366 will provide a gate and condition AND circuit 342 to insert an A bit, FIG. 5*g*, through the arithmetic entry, FIGS. 4*a*, 4*b*.

On the next addition cycle, row 11, the "B" register will contain an A and the "A" register will be zero. This will condition AND circuit 356 to provide an output 370. There will be no output from AND circuits 360, 362, or 364 and the output of inverter 378 will be up. These combinations of lines will condition AND circuit 334 to insert a B in storage.

On the next addition cycle, row 12, the "B" register will contain a B and the "A" register will be zero. In this instance AND circuit 360 would have an output 380, FIG. 5*b*, and the inverter 350 would have an output. AND circuits 336 and 342 would therefore be conditioned to provide an AB output to storage.

*Read-in and encoder (FIGS. 2a, 2b, 2c)*

The circuit of FIG. 2 will be explained using the timing diagram of FIG. 3 which contains descriptive legends of the components. Prior to the time in which the cards are fed into the reading brushes, a read operation signal, FIG. 2*a*, from the operation register on line 100 with a signal, not read scan complete line 95, conditions an AND circuit 96 to furnish an output pulse to the AND circuit 97. This AND circuit will switch a read feed trigger 105 such that the left output is effective to energize the clutch of the card reading mechanism to advance the card beneath the reading brushes. The input 98 is a signal from the card reader. The output from the read feed trigger 105 will further condition AND circuit 107.

At this time the circuit breaker which closes for each row of the card will be open as shown at 115, and the latch 117 will be reset with a raised voltage output to the not impulse CB trigger 121 by way of AND circuit 119. With the read operation code on the line 100, the trigger 119 will be turned ON when the CB 112 opens up to drop latch 117. This is an indication that the pulse for reading data into cores 17 of storage 21 has terminated.

With the trigger 121 going on, the output at the left side of the trigger will provide a gate to the AND circuit 123, FIG. 2*b*, to set the read scan trigger 127 at a time 060 to 090 which appears on line 125. This, it will be noted, is the initiation or beginning of the timing chart of FIG. 3. The read scan trigger 127 will stay on until it is conditioned by a not process signal on line 129 which resets the read scan trigger 127 through an AND circuit 131.

The timing cycles shown at the top portion of FIG. 3 indicate the basic timing used in the present invention and reference can be made to the above-mentioned application, which discloses the system in which the present invention is contained. These timing cycles are generated by a cycle control 43, FIG. 1. In the present operation, which is called read feed, the cycle control 43 will be operated after the initial setup time to generate a B cycle only. B cycles are divided into a read portion and a write portion and occupy respectively the time from about 1.5 to 6 for read and from about 6.3 to 9.5 for write. The read and write times are referred to the readout from storage 21 to a register and the readback into storage.

After the machine has started on the read operation and the timing cycles begin to be generated as shown by the B cycle pulse, FIG. 3, the read feed trigger 105 will be reset by a signal from the read scan trigger which appears at output 111 and a B cycle which appears on line 110 to condition the AND circuit 109, FIG. 2*a*. This, in turn, conditions the AND circuit 103 and the read feed trigger 103 is reset at time T0. This can be seen clearly in FIG. 3.

When the B cycle is generated on line 110 to reset trigger 105, the AND circuit 109 is conditioned to condition the AND circuit 107 to generate a signal on line 113 to encode the 82C digit into storage location which is being read on the present B cycle.

The address 000 in storage 21 is used for storing an indication of the row of the card being read and is selected in cooperation with the read scan control which has been turned ON. The output 141 from trigger 127 is coupled to an AND circuit 143, FIG. 2*b*, which is conditioned by the not impulse CB trigger 121 by a line 145 to provide an output at 147 to force the 000 digits into the address register 45 to select the storage position 000. This procedure over-rides the selection by storage address register 36 as discussed previously. The line 113 which has a signal thereon forces an 82C combination through entry 218 into this location. With the read scan trigger 127 ON and the AND circuit 143 providing a read scan control gate 147, an AND circuit 149, FIG. 2*b*, will be conditioned at time 015 to 030 by input 151 to provide an output 153 which is the reset for the "A" register to insure that no value is placed therein. At the same time the read scan control will condition an AND circuit 155 at time 015 to 045 by line 157 to encode a C in the "A" register 29 at the output 159. This output is longer in duration than the reset output 153 and therefore the "A" register will be left with a C bit therein which is a 0. These two set and reset pulses are shown in FIG. 3.

The sequence of events which have transpired leave the storage position 000 in memory set to a 0 indication and the "A" register set to a 0 indication. The second cycle resets the read feed control trigger 105, FIG. 2*a*. This is accomplished by the output of AND circuit 109 and the output of AND circuit 101 which is conditioned by the read operation code at time 000 to 030 to enable the AND circuit 103 and switch the read feed trigger 105 OFF. This is shown in FIG. 3, at the beginning of the second cycle. As the read feed trigger 105 is switched OFF, the output at the right goes down and conditions the AND circuit 151 which is also conditioned by B cycle line 110, FIG. 2*a*. The AND circuit 139 is conditioned from 000 time to 030 time on line 141 so that the read feed trigger 105 going OFF will attempt to switch the not impulse CB trigger 121 to its opposite state of conductivity. However, the time is such that the not impulse CB cannot be switched at this cycle but must wait for the succeeding cycle when time 0 again present itself to AND circuit 139. This result is achieved by making use of the small delays in resetting the read feed trigger at the same time that we would condition the AND circuit 139 to thus perform a control function. Since the not impulse CB trigger 121 is still ON, the output from the left-hand side would be at a +U voltage to provide when the read feed trigger is turned OFF the two voltages to condition AND circuit 159. The output of AND circuit 159 is connected to AND circuit 161 and with the read scan gate ON, we will set the complement latch 452 in the adder circuit, FIG. 5*a*, by means of the output 163.

During the second cycle, we will read out the character stored in position 000 into the "B" register and by means of the adder, FIG. 5, and "A" register update the character according to a preset sequence. This control is shown at the output 169, FIG. 2*b*, conditioned by the output of AND circuit 167 which in turn has an output by the set complement 163 which is ON and the after one trigger 171 in its OFF condition to allow the resultant character to be restored in its same storage position.

When the set complement line 163 which went ON at the beginning of cycle 2 provided the means by which the digit from the position 000 of storage as it came into the "B" register would be complement added to the digit in the "A" register which is a C bit or zero to generate a 9 which is the complement of 0. The arithmetic digit inhibit line 169 would gate particularly the arithmetic digit inhibit lines shown in FIGS. 4*a*, 4*b*. The character then stored back in the 0 position would be a 9. At the same time, as mentioned previously, we would encode and reset the "A" register. At the beginning of the third cycle, the read transfer trigger would be turned ON at time 0 by the AND circuit 134 in response to the trigger 121 being turned OFF. The other input to AND 134 is present during this operation. In this cycle it is necessary that we still force the 000 position of the storage array which was accomplished by read scan control.

At the end of the third B cycle, the read transfer trigger will be switched back to its OFF state by the coincidence of outputs from AND circuit 139. When the trigger 121 goes OFF, the storage position number 000 will no longer be forced into the address register 45 and the address modified 47 will be allowed to take over and modify the number in address register 36 by one for each cycle. During the third cycle, however, the address 000 will still be used for selecting a storage location and the modifier 47 will modify this number to 001 during the third cycle.

The time in which all this transpired in the card reading cycle was immediately following the brush sensing interval at the very beginning of read scan 9. We are then at the end of a row pulse and the time for scanning and reading into main storage is to follow immediately. On the 9 scan of the card, we will read out each storage location and any row bit associated therewith. This row bit will be sensed by line RD2 and detected by the AND circuit 183 to provide an output 185 to condition AND circuits 187 and 189. These two AND circuits 187 and 189 will be enabled by the output from an inverter 191 conditioned by an AND circuit 193. The conditions necessary for the output of AND circuit 193 are not now present so that AND circuits 187 and 189 will gate the "A" register zone and digit lines 158 and 156 to generate a 9 for each row bit contained in any storage position.

After the complete 80 columns have been sensed, digit position 80 is sensed by a suitable AND circuit, not shown.

At this time the nine row will have been sensed and entered into storage and the data processing machine will be conditioned only on the arrival of a pulse from the circuit breaker latch to initiate operations again. It should be noted with reference to the timing chart of FIG. 3 that operations will commence at the cycle 2 time and all things prior to this time will be not utilized because RD feed trigger 105 is OFF and will not turn ON until the next card cycle. When the card does arrive at row 8, the brush impulse circuit breaker and the CB reset circuit breaker are closed at the same time and set the latch CB 117, FIG. 2*a*. The output from latch 117 will be at a minus value and nothing will happen at this time, except that the row bit buffer in the core memory will be set with all those hold indications which are sensed by the brushes.

At the end of brush impulse time after the CB row bit buffer is set, the CB reset will drop out and the output of the latch 117 will rise and trigger the not impulse CB trigger 121 to give us the raised output as shown in FIG. 2. The action which occurs now is the same as that recounted in the previous two cycles; however, the 82C digit is not set into storage location 000. The results therefore are that the "A" register 238 is restored to 0 on the first cycle (second cycle, FIG. 3) when the 9 is brought out from the 0 location of storage and placed into the "B" register. The complement latch is set, the digit inhibit lines 169 to the adder are signalled so that the sum of 9 from storage and the complement of 0 in the "A" register is read in to position 000. This is an 8. The carry of 1 will be suppressed while the 8 will be placed back into 0 storage location. This action continues until we have transferred the 8 from the "B" register by energizing line 192, FIG. 2*c*, in response to the trigger 135 on the third cycle into the "A" register. The action proceeds as described subsequently with positions 1 to 80 of storage being read out and sampled to see if a bit is present in the bit buffer to thereafter gate into storage an 8 for every row punch which is detected. For special character combinations which consist of more than one numeric row punch, both the "A" and "B" register inhibit lines will be energized. "B" register inhibit lines 197 and 199 are conditioned by the output of an AND circuit 201 which provides an output except in the special combinations of characters sensed by AND circuits 205 and 208. The inverters 202 and 204 in the absence of outputs from ANDS 205 and 208 will enable AND 201.

The action previously described continues until the one row has occurred, at which time the 1 standing in the "A" register is sensed by an AND gate 206 which senses the "A" register not 4 on line 207, "A" register 1 on 209, and the "A" register not C on line 10. These are indications that a 1 is standing in the "A" register. The output of this AND circuit is furnished to the left side of the trigger 171 which with an output from the read scan gate on line 147 operates the trigger 171 to provide an output to the AND circuit 211.

The output of the after 1 trigger is applied to AND circuit 211 which during the time the set complement line has a signal applied thereto will produce an output to the isolation device 216, FIG. 2*c*. While the after 1 trigger is set during row 1 time, the set complement line will not have a signal applied thereto until the following cycle in which row 0 is being sensed.

The zone portion of the read-in functions in the same manner as that explained with relation to numeric except that the zone adder of FIG. 5 is used to obtain the A, B or AB bits for alphanumeric characters.

In these cases where a punch is contained in row 0 and there is no other numeric character at that storage position, the AND circuit 193 will detect the blank in the "B" register and force a zero (82C) by means of AND circuit 194 conditioned by the row bit sensed on line 185.

In reading the 9 row of the card in the first instance, it was necessary that zeroes be inserted where there is no row bit from the bit buffer. This is accomplished by the AND circuit 208, FIG. 2*c*, what is responsive to a 9 in the "A" register to disable the "B" register entry 235, FIG. 4*a*, and prevent the re-entry of data from the "B" register on this row of the card. When AND circuit 208 has an output, the inverter 204 will not have an output and the AND circuit 201 will not provide a signal on lines 199, 197 or 192. It should be noted that outputs 199, 197 or 192 of FIG. 2*c* are the same as inputs 144, 146, and 148 of entry 235.

In using the present invention for providing an output from the storage array for the forming of characters on a data medium, the characters in storage at a given number of locations are scanned through the "B" register and sensed by the digit standing in the "A" register. For each digit which is the same, a signal is provided to the output to code the character forming means whether it be a punch or printer. When the output is a punch and punches holes from the 12 row to the 9, the zone adder is controlled to provide the same type of addition except that a B bit is forced each time to enable the counter to count down instead of up.

It should also be understood that the characters in storage for the output characters could be separated into their individual bits by reading the stored characters from the storage and restoring the bits for each row of the output facility in a bit buffer which may be subsequently read out.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A data interchange device for a data processing machine and a data storage medium on which characters are formed by bits at selected areas which are successively available for processing, processing means individual to each character position of said medium, a storage array containing a plurality of addressable character positions, a plurality of bistable storage elements at each character position, means for connecting at least one bistable element of each addressable character position with the processing means individual to each character position of said medium at each successive area of said storage medium, area register means responsive to said selected areas for indicating the bit area of said medium then available wherein each character position in said storage contains a character coded by the available area of said medium and the coding of the data processing machine for that character position of the medium, means for reading each character from said storage in response to each successive area of said medium, means for sensing the individual characters to determine the presence of the digit contained in said area register, means for re-entering said character into the selected position of storage and means responsive to the presence of said digit for setting this digit in the group of bistable devices coded by the processing machine or the data medium opposite to the group in which said digit was originally contained.

2. The apparatus of claim 1 further including an address register for controlling the selection of a character position from storage, an address modifier for incrementing said address register for each character position selection, a recirculation register settable in response to the output of said storage and entry means connecting the output of said area register and the output of said recirculation register to the input of said storage whereby the digit in said area register or the character in said recirculation register may be written into said selected character position.

3. The apparatus of claim 2 further including an encoder connected to said recirculation register for enabling said entry means connected to said area register whereby the digit stored in said area register may be read into said selected character position.

4. The apparatus of claim 3 further including an adder circuit connected to the output of said recirculation register and said area register and operable in response to each successive area to obtain the digit for storage in said area register.

5. The apparatus of claim 4 further including a data medium control circuit operable in response to each successive area of said medium for reading a particular location in storage into said recirculation register and resetting said area register, means in said circuit to control said adder to perform an addition of the number in said recirculation register and the complemented number of the digit stored in said area register for storage at said selected location, and further means for transferring this digit in storage to said area register.

6. A data input device for a data processing machine comprising a data medium reading station for reading successive bit positions of a character contained on said medium, a storage array containing a plurality of addressable character positions, wherein each character position contains a plurality of semistable bit storage devices, means for connecting said reading station to at least one of said semistable devices for each character on said medium, readout means for said storage array for detecting the state of each of said semistable devices contained in an addressed character position, a digit position register settable in accordance with the bit position of the medium then being read, means for sensing the presence of any bit from said data medium in a character being read, and means for writing the digit stored in said digit register into the storage position from which said character originated.

7. The apparatus of claim 6 wherein said writing means for said storage includes only those bit positions of the character position not connected to said input device.

8. The apparatus of claim 7 further including an address register for controlling the selection of a character position from storage, an address modifier for incrementing said address register for each character position selection, a recirculation register settable in response to the output of said storage and entry means connecting the output of said area register and the output of said recirculation register to the input of said storage whereby the digit in said area register or the character in said recirculation register may be read into said selected character position.

9. The apparatus of claim 8 further including an adder circuit connected to the output of said recirculation register and said area register and operable in response to each successive area to obtain the digit for storage in said area register.

10. The apparatus of claim 9 further including a data medium control circuit operable in response to each successive area of said medium for reading a particular location in storage into said recirculation register and resetting said area register, means in said circuit to control said adder to perform an addition of the number in said recirculation register and the complemented number of the digit stored in said area register for storage at said selected location, and further means for transferring this digit in storage to said area register.

References Cited by the Examiner

UNITED STATES PATENTS

| | | | |
|---|---|---|---|
| 2,702,380 | 2/1955 | Brustman | 340—172.5 |
| 2,772,050 | 11/1956 | Robinson et al. | 235—157 |
| 2,774,429 | 12/1956 | Rabenda | 235—61.11 |
| 2,954,166 | 9/1960 | Eckdahl | 340—172.5 |

OTHER REFERENCES

November 1959, IBM 650 Data Processing Bulletin G 24-5003-0.

MALCOLM A. MORRISON, *Primary Examiner.*

CORNELIUS D. ANGEL, ROBERT C. BAILEY, *Examiners.*